United States Patent
Raheem et al.

(12)

(10) Patent No.: US 11,202,240 B2
(45) Date of Patent: Dec. 14, 2021

(54) SYSTEMS AND METHODS FOR MANAGING AND MONITORING COMMUNICATION SESSIONS

(71) Applicant: Verizon Patent and Licensing Inc., Arlington, VA (US)

(72) Inventors: Abdul Raheem, Irving, TX (US); Kristen Sydney Young, Morris Plains, NJ (US); Farid Feisullin, Leesburg, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 184 days.

(21) Appl. No.: 16/580,819

(22) Filed: Sep. 24, 2019

(65) Prior Publication Data

US 2020/0367129 A1 Nov. 19, 2020

Related U.S. Application Data

(60) Provisional application No. 62/847,026, filed on May 13, 2019.

(51) Int. Cl.
*G06F 16/182* (2019.01)
*H04L 12/24* (2006.01)
(Continued)

(52) U.S. Cl.
CPC ...... *H04W 36/165* (2013.01); *G06F 16/1824* (2019.01); *H04L 41/5009* (2013.01); *H04W 8/12* (2013.01); *H04W 28/0268* (2013.01); *H04W 36/0011* (2013.01); *H04W 36/08* (2013.01)

(58) Field of Classification Search
CPC . H04W 36/165; H04W 8/12; H04W 36/0011; H04W 28/0268; H04W 36/08; H04W 36/14; H04W 8/20; H04W 36/16; H04W 88/06; G06F 16/1824;
(Continued)

(56) References Cited

U.S. PATENT DOCUMENTS

2018/0324645 A1* 11/2018 Park .................. H04W 76/18
2021/0091994 A1* 3/2021 Meirosu ............. H04L 12/1457

FOREIGN PATENT DOCUMENTS

WO WO-2020035871 A1 * 2/2020 ........... G06Q 20/405

OTHER PUBLICATIONS

NGMN Alliance, "5G End-to-End Architecture Framework" V3.0.0 (Year: 2019).*

* cited by examiner

*Primary Examiner* — Moo Jeong

(57) ABSTRACT

A method may include storing, in a block chain ledger, information associated with an agreement between a first service provider associated with a first network and a second service provider associated with a second network. The method may also include receiving, by a device, first capacity information associated with slices in the first network, storing the first capacity information in the block chain ledger and receiving a message associated with a roaming handoff for a communication session in the first network. The method may further include determining, by the device whether adequate resources are available in the second network to support the communication session and sending, to the first service provider, a message indicating that adequate resources are available in the second network to support the communication session.

20 Claims, 9 Drawing Sheets

(51) Int. Cl.
  *H04W 28/02* (2009.01)
  *H04W 36/00* (2009.01)
  *H04W 36/08* (2009.01)
  *H04W 36/16* (2009.01)
  *H04W 8/12* (2009.01)
  *G06F 16/901* (2019.01)
  *H04L 12/26* (2006.01)
  *H04W 36/14* (2009.01)
  *H04W 8/20* (2009.01)
  *H04W 88/06* (2009.01)

(58) Field of Classification Search
  CPC . G06F 16/9024; H04L 41/5009; H04L 43/08; H04L 43/0876; H04L 41/0896
  See application file for complete search history.

SYSTEMS AND METHODS FOR MANAGING AND MONITORING COMMUNICATION SESSIONS

RELATED APPLICATION

This application claims priority under 35 U.S.C. § 119 based on U.S. Provisional Application 62/847,026 filed May 13, 2019, the contents of which are hereby incorporated herein by reference in their entirety.

BACKGROUND INFORMATION

Communication service providers often interact during a communication session associated with a user device. For example, a user device, such as a mobile device may move outside the range of a first communication service provider during a communication session, and to continue to maintain connectivity must connect to the network of a second communication service provider. This process is commonly referred to as "roaming" or a "roaming handoff." In another scenario, an idle user device may be outside the range of the first communication service provider and/or determine that it may be beneficial to use the network of the second communication service provider for communication services. In this scenario, the idle user device may establish a connection with the network of the second communication service provider, also referred to as roaming. Service providers typically negotiate agreements to determine how each service provider will serve users that attempt to roam onto their networks, and how each service provider will be compensated for such service.

Service providers also want to ensure that their users are receiving the service experience that has been agreed to when those users roam on the other provider's network. For example, a roaming agreement may specify a certain service level for roaming users (commonly referred to as a "service level agreement" or "SLA"), such as bandwidth, data/calling/messaging volume, transmission latency, etc. Service providers also want to ensure that they are only being invoiced for actual usage incurred by roaming users. Tracking violations associated with the terms of an agreement between service providers can be very difficult due to the volume of connections, the complexity of the SLA terms, and the number of service providers that may be involved. In addition, service providers typically do not have access to adequate or accurate information regarding potential service violations, for both security and competitive reasons and because the volume of information is unmanageable.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein provide for using a distributed ledger implementing a block chaining system (a "block chain ledger") to assist in managing and monitoring inter-service provider service agreements. In an exemplary implementation, a slice parameter specification, such as slice parameters consistent with the Global System for Mobile Communication Association (GSMA) global slice template (GST), is used to form the basis for an agreement between communication service providers to provide roaming services. Consistent with embodiments described herein, the information specified by the slice parameter specification that is associated with a slice instance may be stored in a block chain ledger. The slice parameter specification may also store information regarding capacities, service features and capabilities of slices available in each service provider's network. The service providers may then use the block chain ledger to ensure that available capacity, service features and capabilities are made available on a partner service provider's network when a roaming connection is made on the partner service provider's network. In addition, event message data and performance data may be provided to the block chain ledger to allow for service level measurement transparency and enforcement, as well as ensuring data security and privacy. In an exemplary implementation, the block chain ledger may also provide governance capabilities regarding data input and data reads to and from the block chain ledger, further ensuring data security and privacy. In an exemplary implementation, the block chain system may also be used to automatically identify service level agreement (SLA) violations, and may forward SLA violation related information to the service providers. Reporting SLA violations in this manner reduces errors with respect to each service provider attempting to identify SLA violations, and also saves time needed to troubleshoot SLA related problems in a roaming/partner network.

Figure 1:
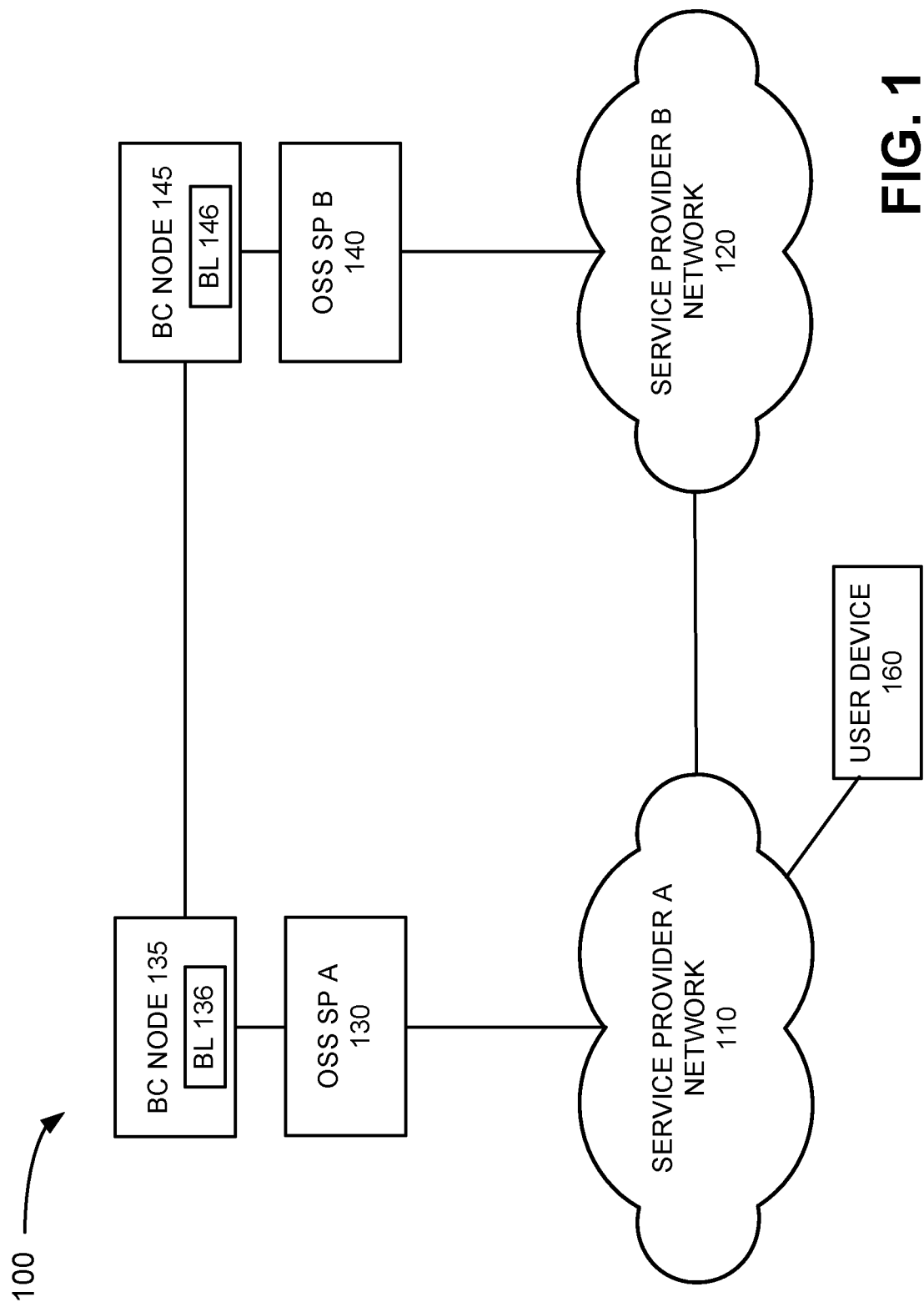
FIG. 1 illustrates an exemplary environment in which systems and methods described herein may be implemented.

FIG. 1 is a block diagram of an exemplary environment 100 in which systems and methods described herein may be implemented. Environment 100 may include service provider A network 110, service provider B network 120, an operational support system (OSS) of service provider (SP) A 130, block chain (BC) node 135, an OSS of SP B 140, BC node 145 and user device 160.

Service provider A network 110 (also referred to herein as service provider network 110 or network 110) may include one or more wired, wireless and/or optical networks that are capable of receiving and transmitting data, voice and/or video signals. For example, network 110 may include one or more public switched telephone networks (PSTNs) or other type of switched network. Network 110 may also include one or more wireless networks and may include a number of wireless stations for receiving wireless signals and forwarding the wireless signals toward the intended destination. Network 110 may further include one or more satellite networks, one or more packet switched networks, such as an Internet protocol (IP) based network, a software defined network (SDN), a local area network (LAN), a personal area network (PAN), a WiFi network, a Bluetooth network, a wide area network (WAN), a long term evolution (LTE) network, a fourth generation (4G) network, a 4G LTE Advanced network, a fifth generation (5G) network, an intranet, the Internet, or another type of network that is capable of transmitting data. Network 110 may provide packet-switched services and wireless Internet protocol (IP) connectivity to user devices, such as user device 160, to provide, for example, data, voice, and/or multimedia services during communication sessions. Network 110 may be implemented such that it supports "network slices"—logical network components capable of being implemented or run on a shared physical network infrastructure, which may comprise one or more virtual network functions (VNFs) or physical network functions, that provide the networking capabilities available to the users of the network slice. Network slicing is described, for example, as part of the specifications of the Third Generation Partnership Project (3GPP) for implementing 5G mobile communications services.

Service provider B network 120 (also referred to herein as service provider network 120 or network 120) may include similar elements as network 110 described above. For example, network 120 may include one or more wired, wireless and/or optical networks that are capable of receiving and transmitting data, voice and/or video signals. Network 120 may also include one or more wireless networks which may include a number of wireless stations for receiving wireless signals and forwarding the wireless signals toward the intended destination, one or more satellite networks, one or more packet switched networks, such as an IP based network, a LAN, a PAN, a WiFi network, a Bluetooth network, a WAN, an LTE network, a 4G network, a 4G LTE Advanced network, a 5G network, an intranet, the Internet, or another type of network that is capable of transmitting data. Network 120 may also provide wireless packet-switched services and wireless IP connectivity to user devices to provide, for example, data, voice, and/or multimedia services. Network 120 may be implemented such that it supports network slices, for example as specified by 3GPP. Service provider B network 120 may be associated with a different service provider than service provider A network 110. For example, networks 110 and 120 may operate as partner networks in which service providers A and B have established mutually agreed upon parameters for roaming, monitoring compliance with the mutually agreed parameters, etc., as described below OSS SP A 130 (also referred to herein as OSS 130) may include one or more computer devices and systems associated with network 110. For example, OSS 130 may include backend applications/systems for managing network 110, including tracking subscribers, identifying particular levels of service, reporting performance data and messages associated with inter-service provider communication sessions, etc., as described in detail below.

Block chain node 135 may include one or more computer devices and systems that implement a block chain for service provider A. For example, block chain node 135 may be one of a number of distributed nodes that form a consensus network that validates entries in a block chain ledger, such as block chain ledger (BL) 136. Block chain node 135 may communicate with other distributed block chain nodes, such as block chain node 145 and other block chain nodes (not shown in FIG. 1), to validate entries in block chain ledger 136. In this manner, information stored in block chain ledger 136 is also stored in the other distributed block chain ledgers, such as block chain ledger 146.

OSS SP B 140 (also referred to herein as OSS 140) may include one or more computer devices and systems associated with network 120. For example, similar to OSS 130, OSS 140 may include backend applications/systems for managing network 120, including tracking subscribers, identifying particular levels of service and delivered service quality, reporting performance data and messages associated with inter-service provider communication sessions, etc., as described in detail below.

Block chain node 145 may be configured in a manner similar to block chain node 135, but may implement the block chain for service provider B. For example, block chain node 145 may include one or more computer devices and systems that are one of a number of distributed nodes that form the consensus network that validates entries in a block chain ledger, such as block chain ledger 146. Block chain node 145 may communicate with other distributed block chain nodes, such as block chain node 135 and other block chain nodes (not shown in FIG. 1) to validate entries in block chain ledger 146. In this manner, information stored in block chain ledger 146 includes the same information as the other distributed block chain ledgers, such as block chain ledger 136.

As described above, block chain nodes 135 and 145 may ensure that entries in block chain ledgers 136 and 146 are properly validated prior to storage in the block chain ledgers. In each case, block chain ledger 136 and 146 store the same information that includes a continuously-growing list of records which is secured from tampering and revision. Each version of the block chain ledger 136/146 may contain a timestamp and a link to a previous version of block chain ledger 136/146. The authorization associated with each entry is added in chronological order to the block chain ledger 136/146 as a cryptographically secured block. Each entry of the block chain ledger 136/146 may be considered a node in a hash tree structure for efficiency. This hash tree ensures that blocks received from block chain nodes are received undamaged and unaltered, and enables block chain nodes to ensure that other applications/devices do not add fraudulent or inaccurate blocks in block chain ledger 136/146.

User device 160 may include a mobile device, such as wireless or cellular telephone device (e.g., a conventional cell phone with data processing capabilities), a smart phone, a personal digital assistant (PDA) that can include a radiotelephone, etc. In another implementation, user device 160 may include any type of mobile or fixed computer device or system, such as a personal computer (PC), a laptop, a tablet computer, a notebook, a netbook, a wearable computer (e.g., a wrist watch, eyeglasses, etc.), a game playing device, a music playing device, a home appliance device, a home monitoring device, an Internet of things (IoT) device, etc., that may include communication functionality. User device 160 may connect to network 110 and other devices in environment 100 (e.g., network 120) via any conventional technique, such as wired, wireless, optical connections or a combination of these techniques. User device 160 and the person associated with user device 160 (e.g., the party holding or using user device 160) may be referred to collectively as user device 160 in the description below. In an exemplary implementation, user device 160 may include a mobile device that may establish a communication session with network 110 and move to an area supported by network 120. In such an instance, the user device 160 may attempt to roam onto network 120, i.e., establish a connection with network 120 to provide communication services for either an active communication session involving user device 160 or a new communication session involving user device 160, as described in more detail below.

The exemplary configuration illustrated in FIG. 1 is provided for simplicity. It should be understood that a typical environment may include more or fewer devices than illustrated in FIG. 1. For example, environment 100 may include three or more service provider networks, multiple OSSs associated with each service provider, additional block chain nodes and block chain ledgers (e.g., three or more) and a large number (e.g., thousands or more) of user devices 160. In addition, environment 100 (e.g., networks 110 and 120) may include additional elements (not shown), such as evolved NodeBs (eNodeBs), next generation NodeBs (gNodeBs), base stations, switches, gateways, routers, monitoring devices, etc., that aid in routing data and supporting communication sessions.

Various functions are described below as being performed by particular components in environment 100. In other implementations, various functions described as being performed by one device may be performed by another device or multiple other devices, and/or various functions described as being performed by multiple devices may be combined and performed by a single device.

Figure 2:
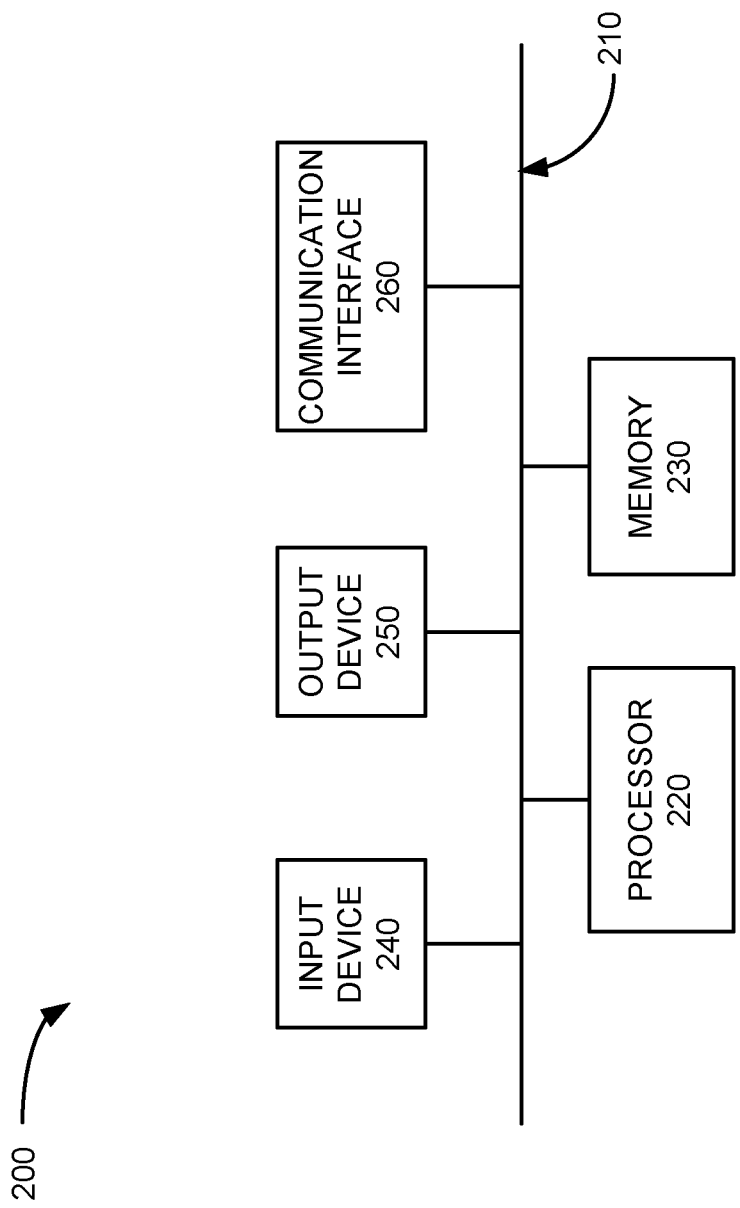
FIG. 2 illustrates an exemplary configuration of components implemented in one or more of the devices/elements of FIG. 1.

FIG. 2 illustrates an exemplary configuration of a device 200. Device 200 may correspond to or include elements implemented in network 110, network 120, OSS 130, OSS 140, block chain node 135, block chain ledger 136, block chain node 145, block chain ledger 146 and user device 160. Referring to FIG. 2, device 200 may include bus 210, processor 220, memory 230, input device 240, output device 250 and communication interface 260. Bus 210 may include a path that permits communication among the elements of user device 110.

Processor 220 may include one or more processors, microprocessors, or processing logic that may interpret and execute instructions. Memory 230 may include a random access memory (RAM) or another type of dynamic storage device that may store information and instructions for execution by processor 220. Memory 230 may also include a read only memory (ROM) device or another type of static storage device that may store static information and instructions for use by processor 220. Memory 230 may further include a solid state drive (SDD). Memory 230 may also include a magnetic and/or optical recording medium (e.g., a hard disk) and its corresponding drive.

Input device 240 may include a mechanism that permits a user to input information, such as a keyboard, a keypad, a mouse, a pen, a microphone, a touch screen, voice recognition and/or biometric mechanisms, etc. Output device 250 may include a mechanism that outputs information to the user, including a display (e.g., a liquid crystal display (LCD)), a printer, a speaker, etc. In some implementations, a touch screen display may act as both an input device and an output device.

Communication interface 260 may include one or more transceivers that device 200 uses to communicate with other devices via wired, wireless or optical mechanisms. For example, communication interface 260 may include one or more radio frequency (RF) transmitters, receivers and/or transceivers and one or more antennas for transmitting and receiving RF data via network 110 and/or 120. Communication interface 260 may also include a modem or an Ethernet interface to a LAN or other mechanisms for communicating with elements in a network, such as network 110, 120 or another network.

The exemplary configuration illustrated in FIG. 2 is provided for simplicity. It should be understood that device 200 may include more or fewer devices than illustrated in FIG. 2. In an exemplary implementation, device 200 performs operations in response to processor 220 executing sequences of instructions contained in a computer-readable medium, such as memory 230. A computer-readable medium may be defined as a physical or logical memory device. The software instructions may be read into memory 330 from another computer-readable medium (e.g., a hard disk drive (HDD), SSD, etc.), or from another device via communication interface 260. Alternatively, hard-wired circuitry may be used in place of or in combination with software instructions to implement processes consistent with the implementations described herein. Thus, implementations described herein are not limited to any specific combination of hardware circuitry and software.

Figure 3A:
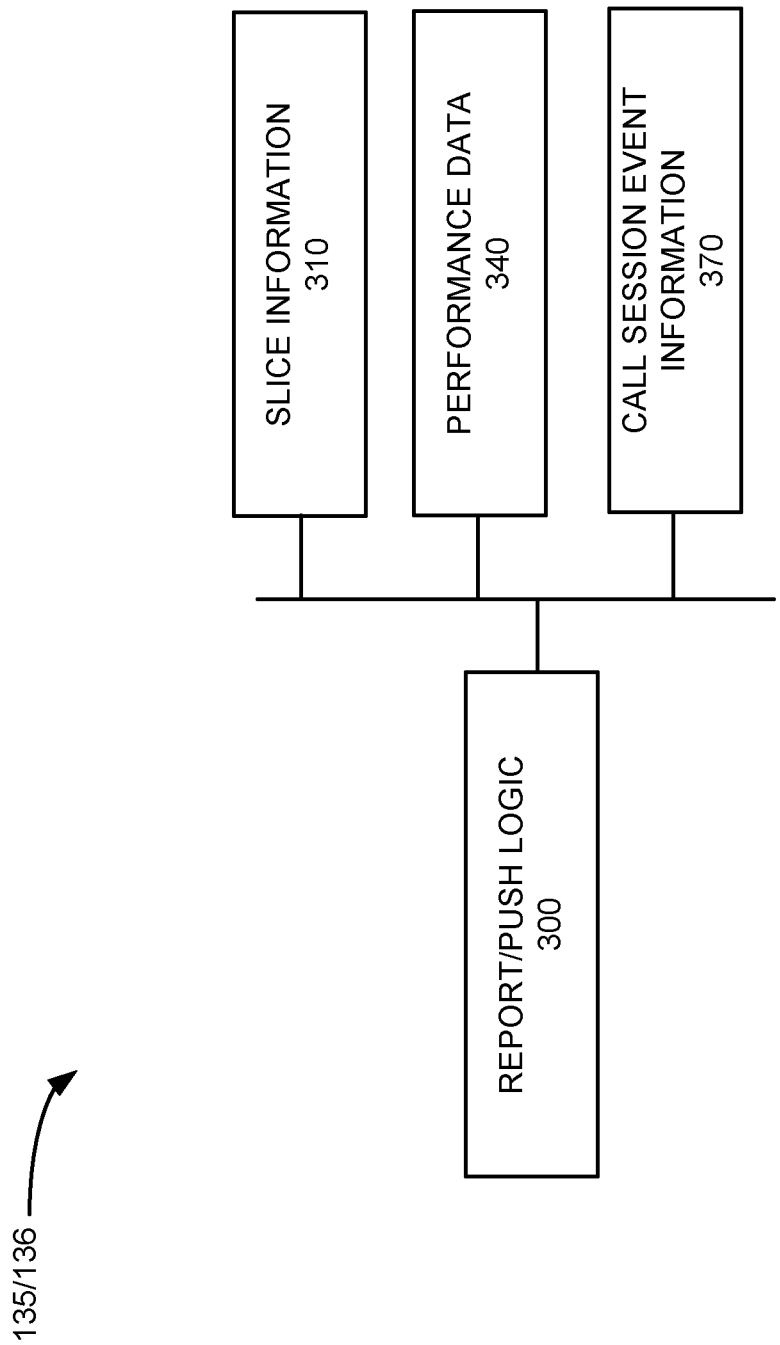
FIG. 3A illustrates an exemplary configuration of components included in the block chain node of FIG. 1.

FIG. 3A is an exemplary block diagram of components implemented in block chain node 135 and/or block chain ledger 136. Block chain node 145 and/or block chain ledger 146 may include similar elements. In an exemplary implementation, all or some of the components illustrated in FIG. 3A may be stored in memory 230 and/or implemented by processor 220 executing software instructions stored in memory 230.

Referring to FIG. 3A, block chain node 135 may include report/push logic 300, slice information 310, performance data 340 and call session event information 370. In an exemplary implementation, slice information 310, performance data 340 and call session event information 370 may be stored in block chain ledger (BL) 136.

Slice information 310 may be associated with the GSMA GST format and may be used to define mutually agreed upon definitions associated with network slices, such as slices used in 5G networks. In one implementation, service providers, such as service providers A and B associated with networks 110 and 120, respectively, may have made agreements with each other regarding how communication sessions that traverse their respective networks should be handled when a user device roams onto the network, and network slicing parameters that reflect the agreed handling of communication sessions for roaming user devices.

Figure 3B:
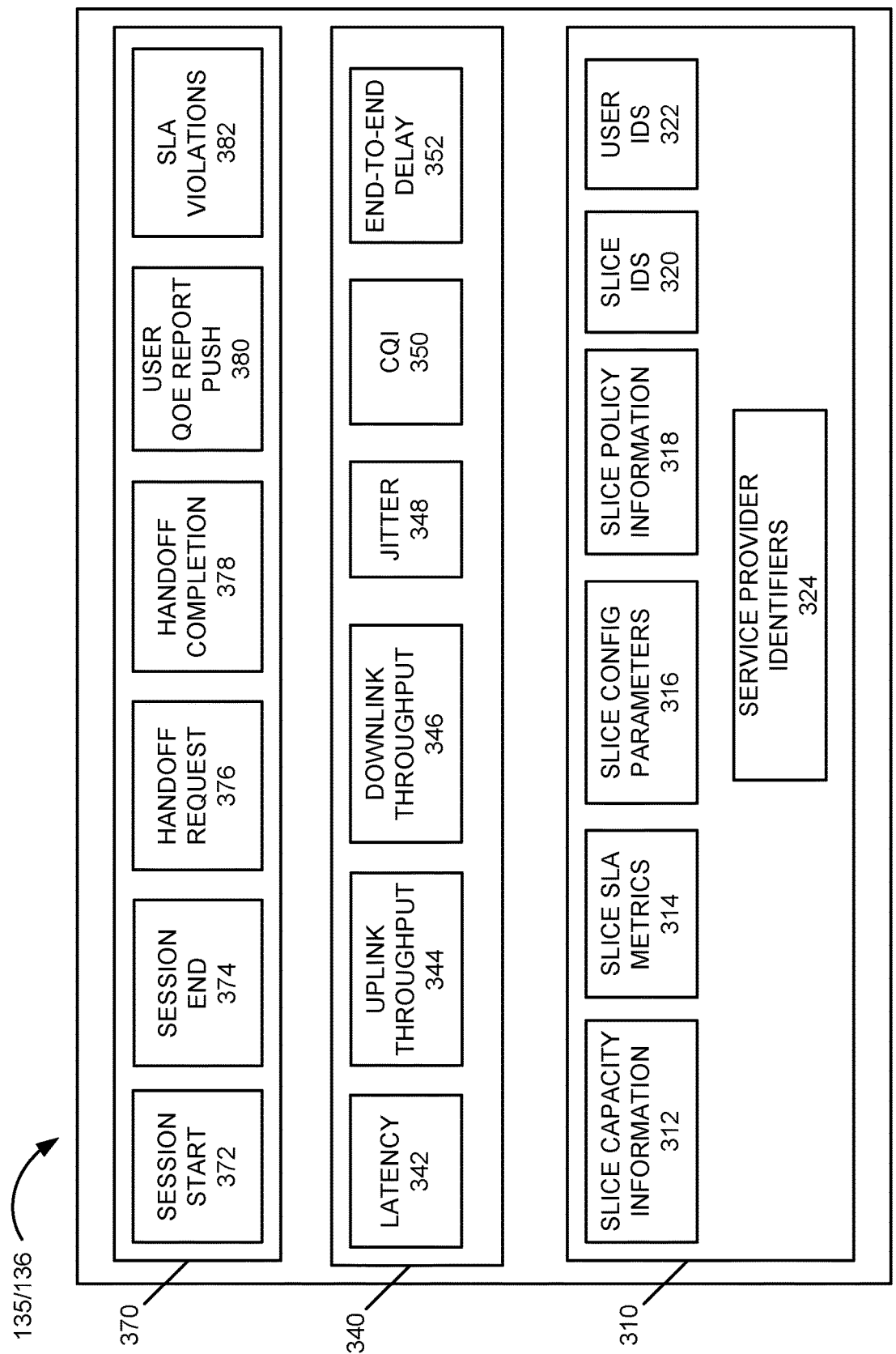
FIG. 3B illustrated exemplary elements and/or data items included within the components/elements illustrated in FIG. 3A.

FIG. 3B illustrates data included in slice information 310, performance data 340 and call session event information 370 in accordance with an exemplary implementation. Referring to FIG. 3B, slice information 310 may include slice capacity information 312, slice SLA metrics 314, slice configuration parameters 316, slice policy information 318, slice identifiers (IDs) 320, user IDs 322 and service providers IDs 324.

Slice capacity information 312 may store information regarding slice capacity information for each slice associated with a service provider that is part of the agreement. For example, assume that service provider A has implemented five slices in network 110 and service provider B has implemented ten slices in network 120. In this case, slice capacity information 312 includes capacity information for the five slices in network 110 and capacity information for the ten slices in network 120. Capacity information may include information on maximum numbers of connections, maximum number of devices, maximum device density, maximum throughput, etc.

Slice SLA metrics 314 may store slice SLA information that is associated with inter-service provider communication sessions. For example, slice SLA metrics 314 may define particular performance monitoring metrics that are required for a particular slice, such as an end-to-end delay of 25 milliseconds (ms), downlink throughput of 10 megabits (MB), etc.

Slice configuration parameters 316 may include parameters associated with the configuration of each slice, such as how a slice is implemented in its respective network (e.g., radio network technologies/services, messaging services, IP/non-IP networking, etc.). Slice policy information 318 may store policy information for each slice. For example, slice policy information 318 may store information indicating whether a particular slice in network 110 can be serviced or implemented by a particular slice in network 120, whether to allow for variations in SLA metrics associated with slices in different networks, etc. Slice IDs 320 may store identifiers for each slice instantiated by service providers A and B. For example, as discussed above, service provider A may implement five slices and service provider B may implement 10 slices. Each of these slices may include a unique slice ID. User IDs 322 may store identifiers associated with particular users/subscribers of service providers A and B. The user IDs may allow the users/subscribers to obtain information of interest from BL 136. Service provide IDs 324 may store identifiers associated with service providers A and B, as well as any other service providers with whom service agreements are made and stored in BL 136.

As described above, block chain ledger 136 may store performance data 340 associated with monitoring the service agreement between service providers A and B. Referring to FIG. 3B, in an exemplary implementation, performance data 340 may include latency 342, uplink throughput 344, downlink throughput 346, jitter 348, channel quality indicator (CQI) 350 and end-to-end delay 352, with individual entries corresponding to particular communication sessions and systems.

Latency 342 may store information regarding latency measurements in a communication session. Uplink throughput 344 may store an uplink data throughput (e.g., from user device 160 to network 110). Downlink throughput 346 may store downlink data throughput for a communication session (e.g., data sent from network 110 to user device 160). Jitter 348 may store jitter information for a communication session. CQI 350 may store channel quality for a slice involved in a communication session. End-to-end delay 352 may store the time for a packet/communication sent by, for example, user device 160 to arrive at its destination. In one implementation, block chain node 135 may use performance data 340 to automatically determine if SLA violations have occurred during a communication session, as described in more detail below.

As also described above, BL 136 may also store call session event information 370. Referring to FIG. 3B, in an exemplary implementation, call session event information 370 may include session start 372, session end 374, handoff request 376, handoff completion 378, user quality of experience (QoE) report push 380 and SLA violations 382. Session start 372 may store a time/timestamp corresponding to the start of a communication session. Session end 374 may store a time/timestamp corresponding to the end of the communication session. Handoff request 376 may store information associated with a handoff from service provider A to service provider B, or vice versa, such as the time and other content within the transmitted and received handoff request. Handoff completion 378 may store a timestamp (and corresponding handoff message content) indicating when a handoff was completed. User QoE report push 380 may represent information sent from a user device, such as user device 160, representing a metric regarding the quality of a communication session, such as a number on a scale of 1-10, a qualitative indicator, such as good, poor, etc. SLA violations 382 may include violations associated with a service provider not meeting mutually agreed service levels during a communication session based on stored slice information 310 and performance data, as described in detail below.

Although FIGS. 3A and 3B show exemplary components of block chain node 135 and BL 136, in other implementations, block chain node 135 and BL 136 may include fewer components, different components, differently arranged components, or additional components than depicted in FIGS. 3A and 3B. In addition, functions described as being performed by one of the components in FIGS. 3A and 3B may alternatively be performed by another one or more of the components of block chain node 135 and/or BL 136.

Figure 4:
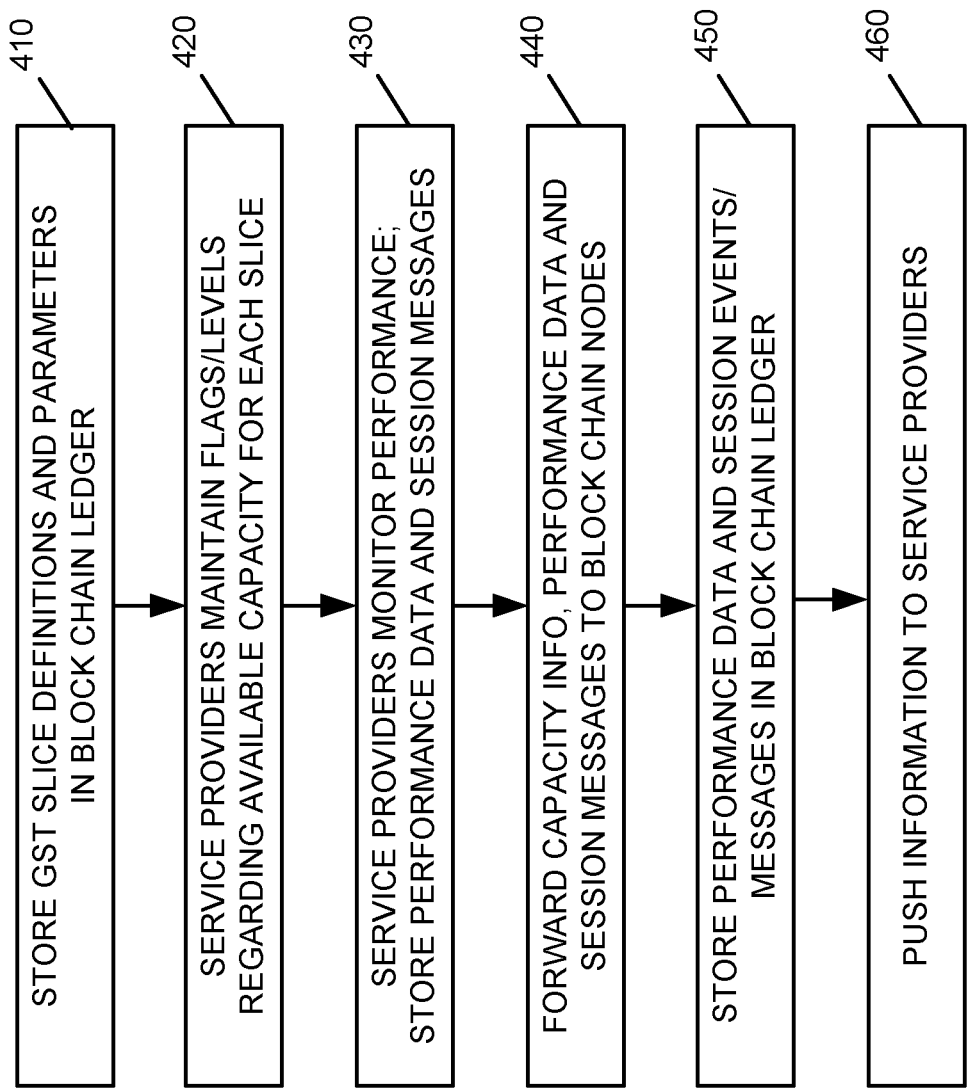
FIG. 4 is a flow diagram illustrating processing associated with provisioning and configuring agreements between service providers in accordance with an exemplary implementation.

FIG. 4 is a flow diagram associated with provisioning and configuring agreements between service providers, such as a service providers A and B, using block chain nodes 135 and/or 145. Processing may begin with service providers agreeing to parameters associated with a user roaming arrangement that will be implemented and adhered to by the service providers. For example, service provider A associated with network 110 and service provider B associated with network 120 may agree upon slice definitions and other slice parameters that will be used when user devices request roaming service on each other's networks. Service providers A and B may also agree how service provider A's slices will be mapped to correspond with service provider B's slices, such as when each service provider has a different number of slices, different slice types, etc. For example, if a user device is being served using slice X in network 110, the roaming agreement may specify that the user device will be served by slice Y in network 120 if it roams to network 120. As described above, it is assumed that both of service providers A and B have implemented or instantiated the slices associated with the agreement in their respective networks. The mutually agreed upon parameters may also include slice information 310 described above.

After agreeing to the slice definitions and parameters, service provider A and/or service provider B may store the slice definitions and other slice information/parameters (e.g., slice information 310) in BL 136/146. For example, OSS 130 may forward the agreed upon slice definitions and parameters to block chain node 135. OSS 140 may similarly forward agreed upon slice definitions and parameters to block chain node 145. Block chain node 135 and 145 may receive the slice definitions and parameters and store the information in BLs 136 and 146, respectively (block 410). For example, block chain node 135 may store the information in appropriate entries/modules of BL 136.

Environment 100 may include a distributed consensus network that includes network devices that participate in validation of shared ledger entries stored in BL 136 and 146. For example, in one implementation, the distributed consensus network may include block chain nodes 135 and 136, OSS SP A 130 and OSS SP B 140 or other nodes (not shown). For example, multiple servers or proxy nodes running in cloud or edge compute clusters/farms can be leveraged as a consensus network. Each participating node in the distributed consensus network maintains a continuously-growing list of records that are secured from tampering and revision. Any updates from a trusted node, such as BC node 135 and BC node 136 will be added into the shared ledger. As described above, each version of the shared ledger contains a timestamp and a link to a previous version of the shared ledger. The authorization is added in chronological order to the shared ledger, and the shared ledger is presented to each of the block chain nodes as a cryptographically secured block. Each entry of the shared ledger may be considered a node in a hash tree structure for efficiency. This hash tree ensures that blocks received from the trusted node are received undamaged and unaltered, and enables the distributed consensus network to check that the other nodes in the distributed consensus network do not have fraudulent or inaccurate blocks in the shared ledger. Implementations described herein may be used with any consensus model/mechanism associated with the shared ledger, such a proof of work (PoW) consensus mechanism, a proof of stake (PoS) consensus mechanism, a proof of elapsed time (PoET) consensus mechanism, a Byzantine fault tolerance (BFT) consensus mechanism, or any other consensus model/mechanism.

In some implementations, the block chain nodes/ledgers 135/136 and 145/146 provide for automatic discovery and negotiation of service agreement. For example, service providers A and B associated with networks 110 and 120, respectively, may publish the types of roaming service they will support in the form of one or more slice definitions stored in BLs 136 and 146. Slice definitions may be according to standard templates (e.g., GST) to allow comparison of service parameters, Block chain nodes 135/136 may also store information on the slice information that would be acceptable to each service provider to allow roaming services to be provided to its users. In this implementation, if service provider A needs another service provider (e.g., service provider B) to provide a particular level of roaming service for its subscribers, block chain node 135 may search BL 136 to find the slice definitions that are the best match for providing the roaming service. Service provider A and service provider B may then exchange messaging to confirm mutual acceptance of the service terms (for example, using an off-chain communication mechanism provided by the block chain system), and then provide an indication of acceptance to BLs 136/146. In some implementations, service providers A and B may further negotiate the service via BL 136/146. In this manner, service providers A and B may use slice definitions to describe service offerings, the service providers A and B may then publish, offer and negotiate services via the BL 136/146. This may allow the service providers A and B to automate roaming agreements without "offline" negotiations between service providers A and B.

Returning to FIG. 4, each of service providers A and B may maintain flags and/or levels indicating the capacity available for each slice defined in BLs 136/146 (block 420). For example, OSS 130 may monitor network 110 and provide updated capacity levels for each slice in network 110 based on the particular loading for each slice in network 110. OSS 140 may monitor network capacity levels in network 120 in a similar manner. Each of service providers A and B may also monitor performance data and call session event information/communication session messages in networks 110 and 120, respectively (block 430). For example, OSS 130 may monitor and log performance data and session messages associated with communication sessions in network 110 (e.g., call session event information 370), such as session initiations, handoffs, call terminations for calls placed on the slices, dropped calls/sessions, etc. (block 430). OSS 140 may similarly monitor performance data and messages in network 120 for service provider B. Service providers A and B may send the capacity information, performance data and call session event information/session messages to block chain nodes 135 and 145 for storage in BLs 136 and 146 (block 440).

In an exemplary implementation, block chain nodes 135 and 145 may receive the information from service providers A and B and after validating the information, store the data in BLs 136 and 146 (block 450). In an exemplary implementation, block chain nodes 135 and 145 may abstract or generalize the received data based on mutually agreed upon contracts or policies associated with the stored slice information. For example, block chain nodes 135 and 145 may determine what information is to be visible to service providers A and B regarding each other's networks based on mutually agreed upon parameters (e.g., stored in slice information 310) and modify the received information based on the agreed parameters and store the abstracted/generalized information regarding performance and messages in BLs 136 and 146. This abstracted/generalized information may then be viewed and/or retrieved by service providers A and B and users/customers.

As described above, in some implementations, block chain nodes 135 and 145 may report or push state change information to service providers A and B. For example, report/push logic 300 (FIG. 3A) included in block chain nodes 135 and 145 may automatically forward information to service provider A indicating that there is no capacity or low capacity for particular slices in service provider B's network 120 (block 460). As another example, report/push logic 300 may forward SLA violation occurrences to OSS 130 and/or OSS 140, as described in more detail below. In this manner, block chain nodes 135 and 145 may provide information to the service providers without requiring service providers A and B to log into BLs 136 and 146 and obtain the information of interest. This may save significant time for service providers and streamline processing.

As described above, a user device may roam onto another service provider's network while an active communication session exists to maintain connectivity for the active/existing communication session. A user device may also roam onto the other service provider's network when no active communication session.

Figure 5:
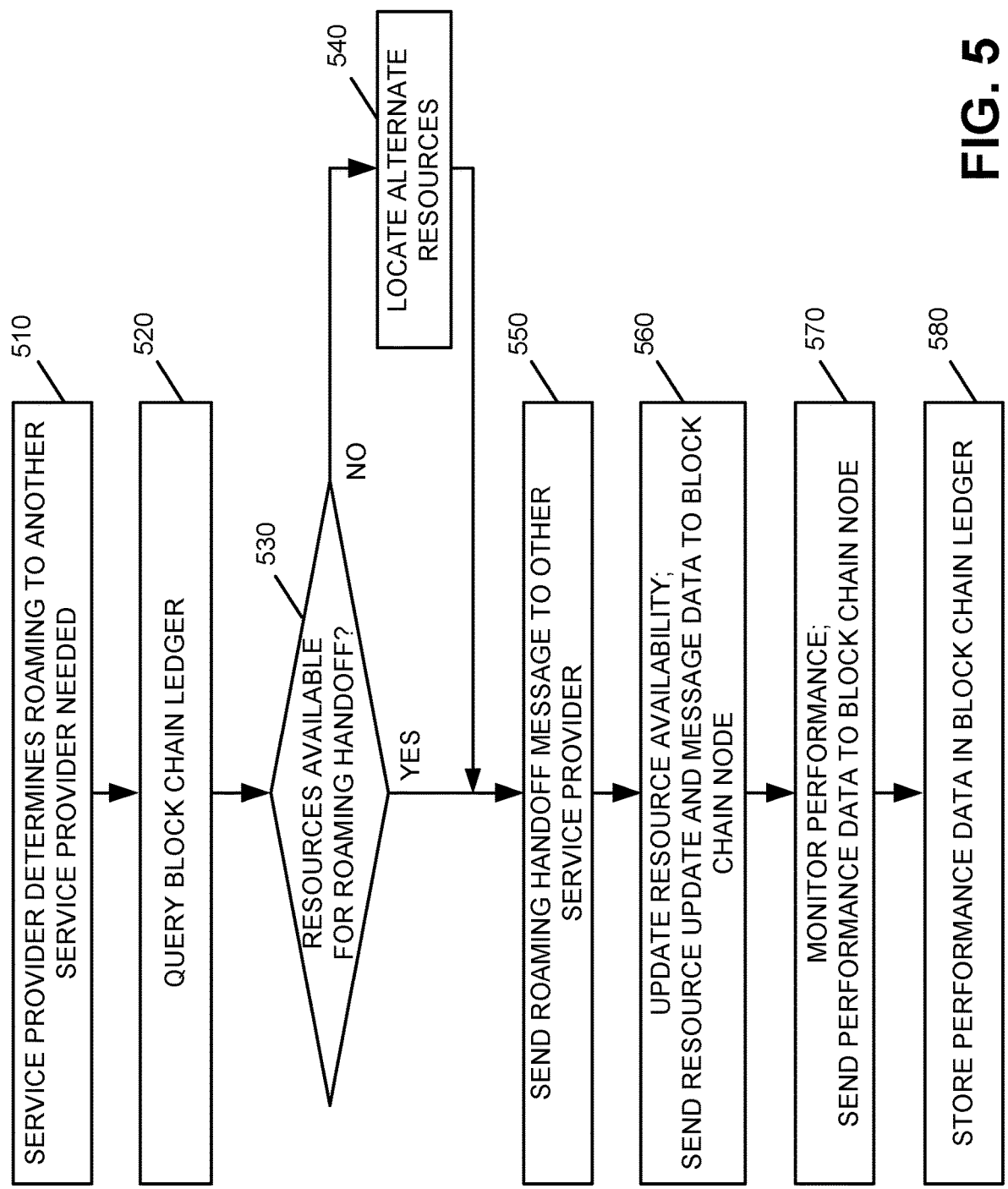
FIG. 5 is a flow diagram illustrating processing associated with a roaming handoff between service providers in accordance with agreed upon definitions and parameters in accordance with an exemplary implementation.
Figure 6:
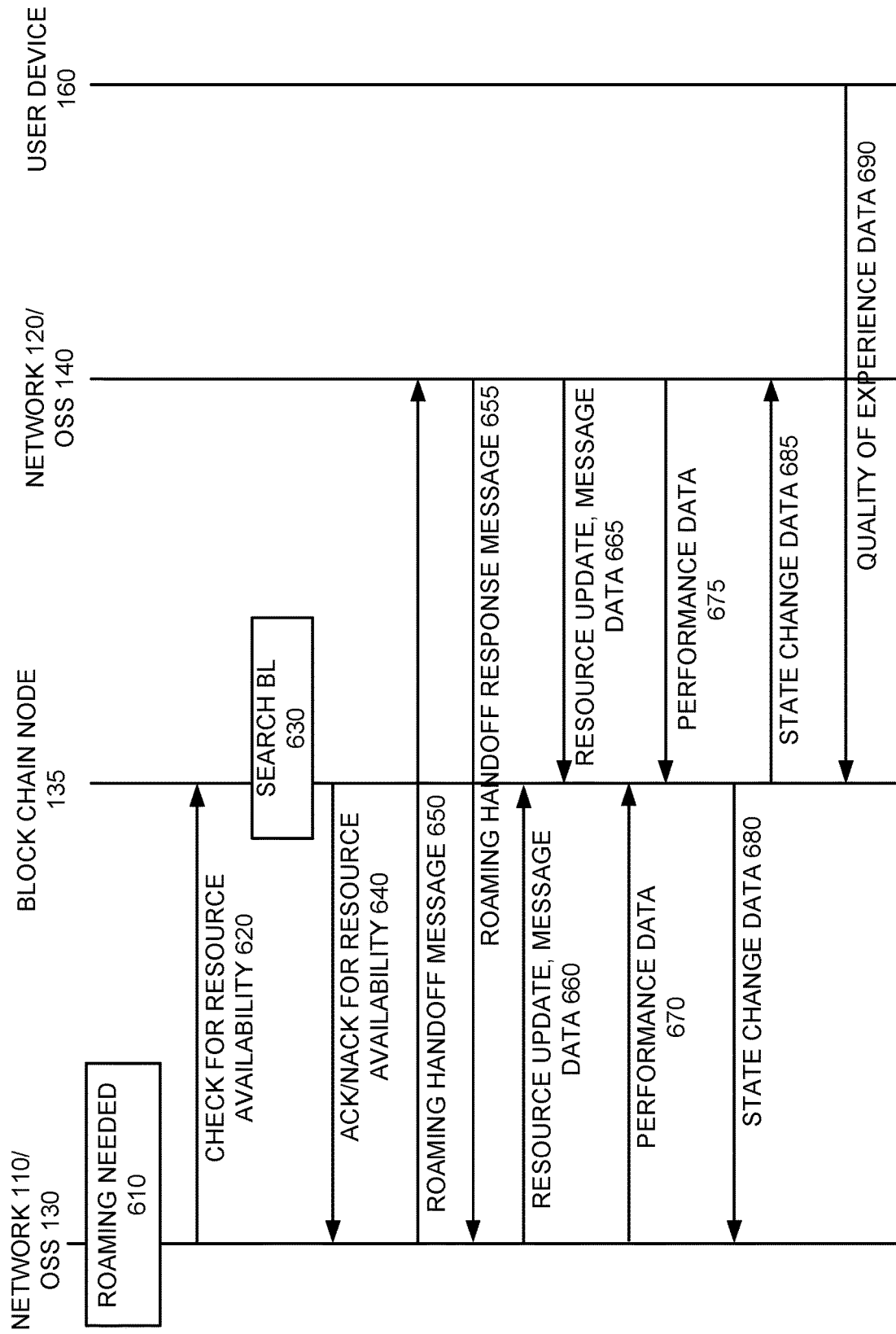
FIG. 6 is a signal flow diagram associated with the processing of FIG. 5.

FIG. 5 is a flow diagram illustrating processing associated with roaming during an active communication session in accordance with agreed upon slice definitions and parameters. The flow diagram of FIG. 5 is described in conjunction with the signal flow diagram of FIG. 6. As described above, both service providers A and B maintain block chain ledger records regarding the capacity availability on networks 110 and 120, respectively, to support each slice type defined in BLs 136 and 146. Processing may begin with a user at user device 160 interacting with service provider A network 110. The user at user device 160 may be a customer/subscriber of services from service provider A. Assume that user device 160 has initiated a communication session which is provided via network 110. Further assume that user device 160 is moving into an area serviced by service provider B and wishes to continue the active communication session via network 120. In this case, service provider A may determine that a roaming handoff to service provider B is needed. For example, elements in network 110 and/or OSS 130 may determine that based on strength of signals from user device 160 to a wireless station, gNodeB, eNodeB, etc., in network 110, a roaming handoff is needed to support the active communication session (block 510; FIG. 6, 610).

OSS 130 may query block chain node 135 to determine whether resources are available in service provider B network 120 to support the communication session (block 520; FIG. 6, 620). The query may include the particular slice ID for the communication session in network 110, as well as other slice capacity related metrics. Block chain node 135 receives the query and accesses BL 136 to determine if adequate resources are available for the roaming handoff (block 530; FIG. 6, 630). For example, block chain node 135 may determine that the particular received slice ID corresponds or maps to a particular slice ID for service provider B and determines whether adequate resources are available for that slice ID in network 120.

If block chain node 135 determines that adequate resources are available for the roaming handoff (block 530—yes), block chain node 135 sends an acknowledgement message to OSS 130 indicating that adequate resources are available (FIG. 6, 640). OSS 130 receives the indication that adequate resources are available for the handoff.

If block chain node 135 determines that adequate resources are not available to support the handoff (block 530—no), block chain node 135 may send a negative acknowledgment to OSS 130 (FIG. 6, 640) and locate alternate resources (block 540). For example, if a third service provider is included in the GST stored in BL 136, block chain node 135 may determine if resources are available for the slice handoff in a third network associated with the third service provider. Block chain node 135 may also check, for example, slice policy information 318 to determine if service provider A is willing to accept a different SLA for the communication session associated with the particular slice. In still other implementations, service providers A and B may have previously negotiated an acceptable service for roaming handoffs associated with particular slices via BLs 136/146. In each scenario, assume that alternate resources are located and selected for the roaming handoff.

In either case (e.g., resources are available or alternate resources are located), OSS 130 may signal network 110 to send a roaming handoff message to service provider B network 120. Network 110 receives the signal and sends the roaming handoff message to network 120 (block 550; FIG. 6, 650).

Network 120 receives the roaming handoff message and takes over the communication session. Network 120 may also send a roaming handoff response message to network 110 (FIG. 6, 655). The roaming handoff message and roaming handoff response message may each be sent in accordance with relevant 3rd Generation Partnership Project (3GPP) standards/protocols.

Upon the successful roaming handoff, both service providers A and B update available resources on networks 110 and 120, respectively (block 560). For example, OSS 130 may update the resources available for the slice involved in the handed off communication session. Similarly, OSS 140 may update the resources available in network 120 for the slice involved in the new communication session that was handed off from network 110 to network 120. Service providers A and/or B may send updated resource information and call session event/message data to their respective block chain nodes 135/145 (block 560; FIGS. 6, 660 and 665). For example, OSS 130 may send the updated resource availability information regarding the communication session/slice which was handed off, as well as send the handoff message to block chain node 135. Block chain node 135 may store the updated resource availability information and the handoff message in BL 136. OSS 140 may similarly send updated resource availability information to block chain node 145 for storage in BLs 146 and 136.

OSS 130 may also continue to monitor performance of slices in network 110 (block 570). For example, OSS 130 may monitor network 110 in real time or near real time, update the performance associated with network slices and forward the updated performance data to block chain node 135 for storage in BL 136 (block 580; FIG. 6, 670). Similarly, OSS 140 may send updated performance data to block chain node 145 for storage in BL 146 and BL 136 (block 580; FIG. 6, 675). For example, OSS 140 may send performance data associated with the communications session in which the roaming handoff of user device 160 from network 110 to network 120 was performed to block chain node 145. This updated performance information may be used to identify possible SLA violations, as described in more detail below.

As described above, in some implementations, block chain nodes 135 and 145 may forward or push state change information to service providers A and B. For example, block chain node 135 may forward state change data to OSS 130 and OSS 140 (FIG. 6, 680, 685). Automatically forwarding state change data to service providers A and B may simplify processing associated with service providers A and B obtaining information of interest.

As also described above, in some implementations, a user may provide QoE data and/or QoS data to block chain nodes 135 and 145. For example, user device 160 may be configured to automatically send network performance measurements on a periodic basis, or user device 160 may include a graphical user interface that allows the user to input a qualitative or quantitative value representing the quality of the communication session (e.g., 1-10, good, fair, poor, etc.). User device 160 may forward this information to network 120 (or network 110), which may then cause the block chain node 135 or 145 to store the information in BLs 136 and 146 (FIG. 6, 690).

As described above with respect to FIG. 5, OSS 130 may query BL 136 to determine whether adequate resources are available for a roaming handoff. As also described above with respect to FIG. 4, OSS 130 and OSS 140 may each monitor network capacity levels on their respective networks and provide updated capacity levels for slices in networks 110 and 120, respectively. In some implementations, OSS 130 and OSS 140 and/or other devices in environment 100, such as a network data analytics function (NWDAF), a radio access network intelligent controller (RIC), etc., may perform these functions as background processes. For example, OSS 130 and OSS 140 may periodically poll network resources/elements regarding availability, and update slice availability and other resource availability information in a dynamic manner. In some instances, the frequency and/or timing of the polling may be performed based on the threshold associated with resource availability (e.g., a network with lower resource availability may be polled more often than a network with higher resource availability), the time of day, the expected resource use, etc. In each case, the OSSs 130 and 140 and/or other elements in networks 110 and 120 may maintain current information regarding resource availability for roaming users.

In addition, the current resource availability information may be stored within BLs 136 and 146, as well as in other devices that may be more quickly accessed than BLs 136 and 146 when resource availability information is needed for roaming or other purposes. In each case, service providers A and B maintain current resource availability information that is available any time a roaming connection is needed to allow service providers A and B to be able to quickly ascertain whether adequate resources are available for roaming users.

As described above, a user device may roam onto the other service provider's network when active communication session exists. A user device may also roam onto the other service provider's network when no active communication session exists, such as when the user device is in an idle mode.

Figure 7:
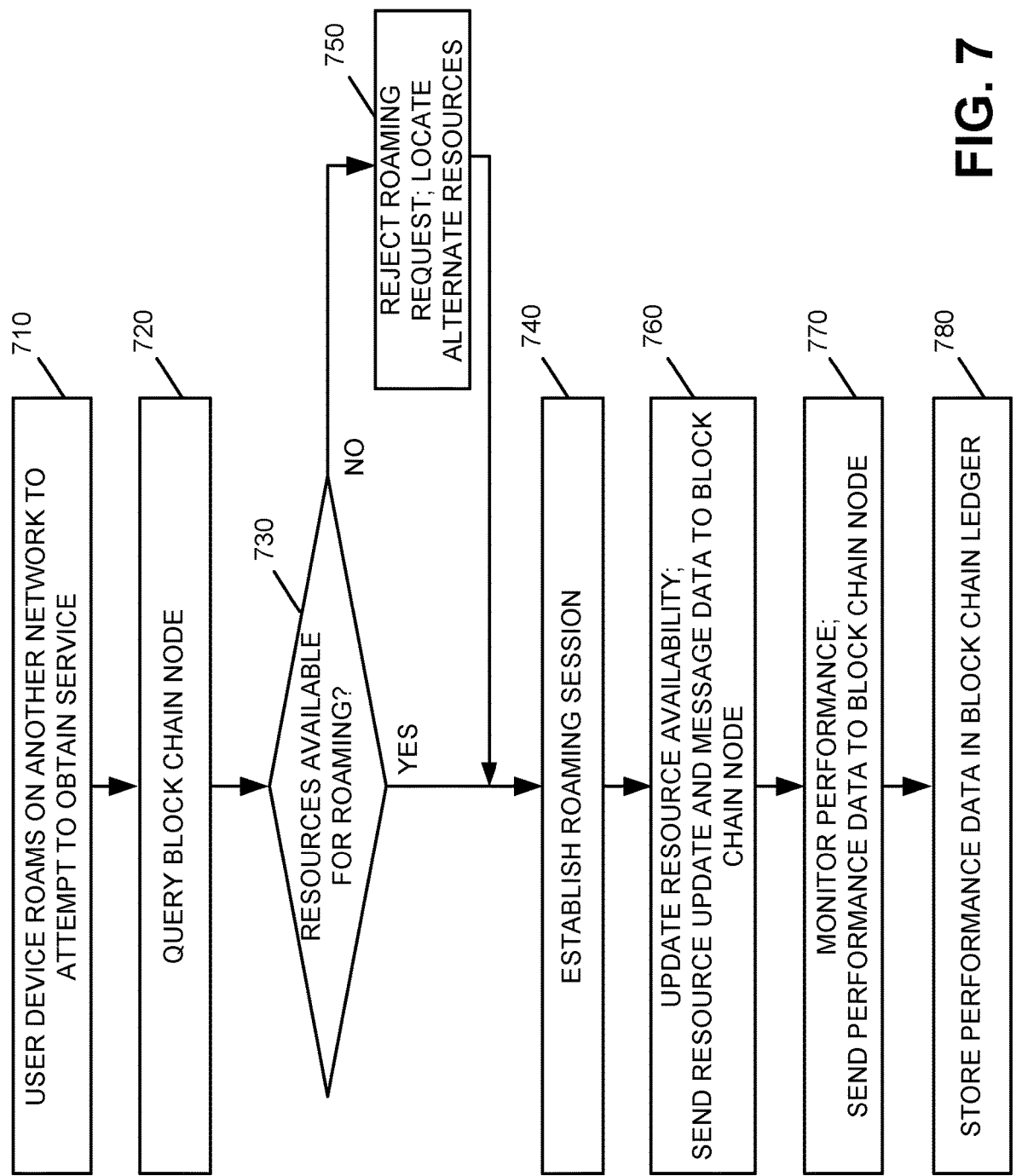
FIG. 7 is another flow diagram illustrating processing associated with roaming in accordance with an exemplary implementation.

FIG. 7 is a flow diagram illustrating processing associated with roaming when no active communication exists, in accordance with agreed upon slice definitions and parameters. Assume that user device 160 determines that it is desirable to use service provider B network 120 for communications services. For example, user device 160 moves outside the range of service provider network 110 or determines that the signal strength of network 120 is better than network 110. In this implementation, user device 160 may attempt to obtain service on network 120, for example, by requesting registration, presenting credentials, etc. (block 710).

OSS 140 may then query block chain node 145 to determine what resources have been agreed to between service provider B and service provider A to support communication sessions for users of network 110 roaming on network 120 (block 720). The query may include the particular slice ID for the communication session, as well as other slice capacity related metrics. Block chain node 145 receives the query and accesses BL 146 to determine the applicable resources for user device 160 (block 730). For example, block chain node 145 may determine that the particular received slice ID corresponds or maps to a particular slice ID for service provider B. OSS 140 may then determine whether the slice ID is currently active in network 120, and whether adequate resources are available for that slice ID in network 120.

If OSS 140 determines that adequate resources are available to provide services to user device 160 (block 730—yes), OSS 140 may then signal network 120 to establish a roaming session for user device 160 (block 740). For example, elements of network 120 may request subscription information associated with user device 160 from network 110. OSS 140 may also instruct block chain node 145 to write to the block chain ledger 146 information indicating that roaming service is being provided to user device 160 (e.g., identifiers, timing, slice information).

Returning to block 730, if OSS 140 determines that a roaming agreement has not been established between service provider A and service provider B, or that adequate resources are not available for the slice specified to be used to support providing service to user device 160, OSS 140 may instruct network 120 to reject the service request by user device 160 (block 750). In some implementations, if adequate resources are not available on the designated slice, OSS 140 may permit service on a different slice having different service characteristics. For example, if the designated slice is in full use, OSS 140 may permit user device to use a "best efforts" slice that has service limitations (e.g., bandwidth/volume constraints). In this example, block chain node 145 may locate alternate resources in BL 146 and establish a roaming session using the alternate resources/slice (blocks 750 and 740). Usage of the alternate slice may be stored in BL 146.

Upon the successful establishment of the roaming connection, both service providers A and B update available resources on networks 110 and 120, respectively (block 760). For example, OSS 130 may update the subscription information for user device 160 to indicate that user device 160 is roaming in network 120. OSS 140 may also update the resources available in network 120 for the slice involved in the new communication session that was established in network 120. Service provider B may send updated resource information and call session event/message data to block chain node 145 (block 760). Block chain node 145 may store the updated resource availability information in BL 146.

OSS 140 may also continue to monitor performance of slices in network 120 (block 770). For example, OSS 140 may monitor network 120 in real time or near real time, update the performance associated with network slices and forward the updated performance data to block chain node 145 for storage in BL 146 (block 780). Similarly, OSS 130 may send updated performance data to block chain node 135 for storage in BL 136 and BL 146 (block 780). For example, OSS 140 may send performance data associated with communications sessions for user device 160 to block chain node 145. This updated performance information may be used to identify possible SLA violations, as described in more detail below.

As described above, in some implementations, block chain nodes 135 and 145 may forward or push state change information to service providers A and B. For example, block chain node 155 may forward state change data to OSS 140 and OSS 130. Automatically forwarding state change data to service providers A and B may simplify processing associated with service providers A and B obtaining information of interest.

As also described above, in some implementations, a user may provide QoE data and/or QoS data to block chain nodes 135 and 145. For example, user device 160 may be configured to automatically send network performance measurements on a periodic basis, or user device 160 may include a graphical user interface that allows the user to input a qualitative or quantitative value representing the quality of the communication session (e.g., 1-10, good, fair, poor, etc.). User device 160 may forward this information to network 120 (or network 110), which may then cause the block chain node 145 or 135 to store the information in BLs 146 and 146.

As described above, in an exemplary implementation, service providers A and B may determine resource availability via BLs 136 and 146. In other implementations, OSSs 130 and HO and/or service orchestrators for each service provider may perform all or some of these functions. In addition, all or some of these functions may not be implemented via the block chain (e.g., BLs 136 and 146). In still other implementations, each service provider may publish slice information into BL 136/146 for which the service provider has resources to instantiate, and removes (e.g., un-publishes) slice information from BL 136/146 for which the service provider no longer has resources to instantiate. In this implementation, publishing/un-publishing slice information associated with the service providers A and B may be implemented through a service provided by BLs 131/146. In this manner, BLs 136/146 may store current or real time information regarding services that each service provider A and B can support. As a result, when service provider A is attempting to identify a roaming partner that offers a particular roaming capability (or best-match roaming service), BLs 136/146 can be searched to identify a catalog of services (e.g., published by all service providers into the BL) that are currently instantiable.

As described above, block chain nodes 135 and 145 may store performance data 340 in BLs 136 and 146. Block chain nodes 135 and 145 may then use the performance data 340 to detect SLA violations or other issues in networks 110 and 120.

Figure 8:
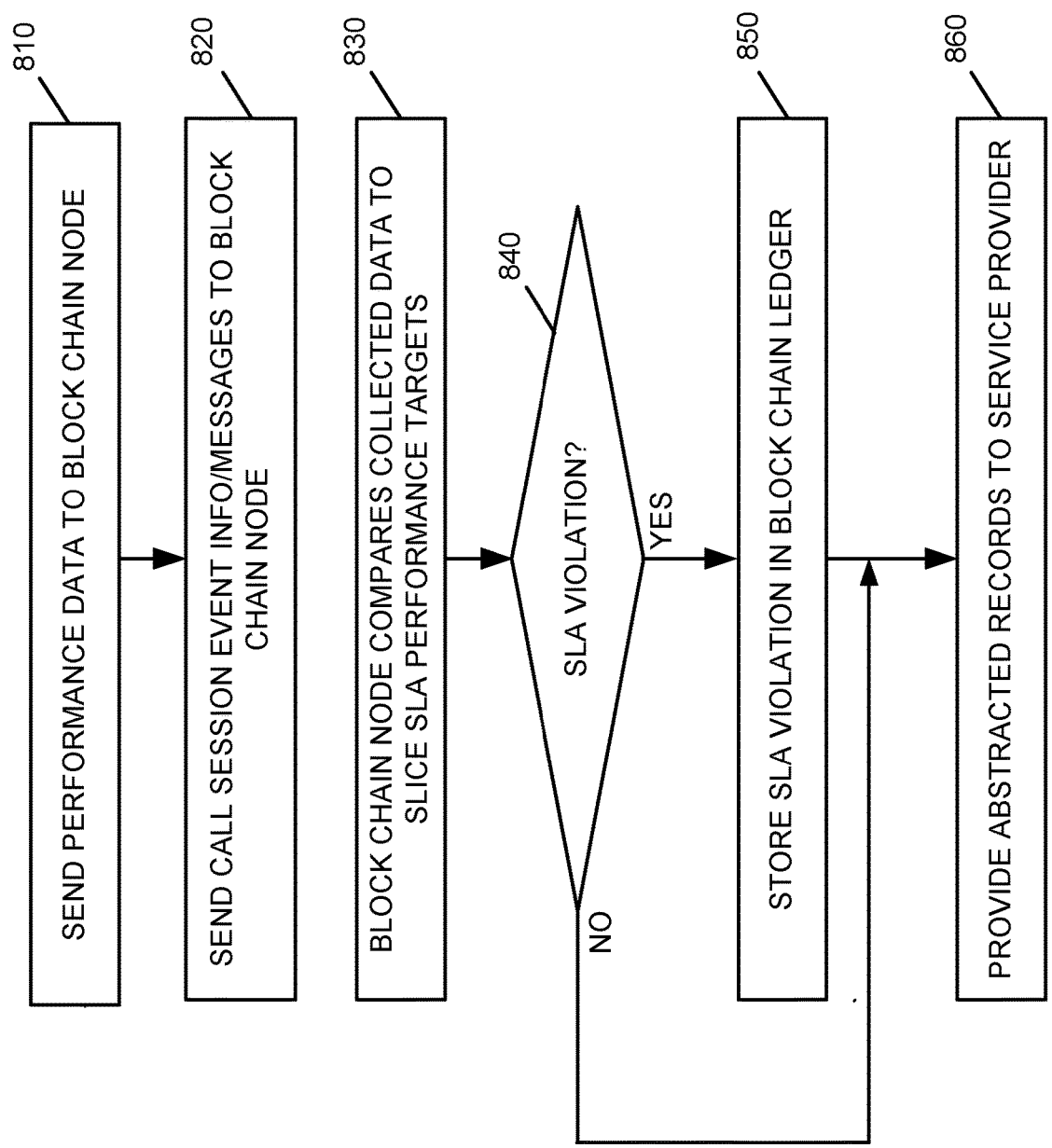
FIG. 8 is a flow diagram illustrating processing associated with identifying violations in accordance with an exemplary implementation.

FIG. 8 is a flow chart illustrating processing associated with identifying SLA violations in accordance with an exemplary implementation. Processing may begin with service provides A and B periodically sending performance data to block chain nodes 135 and 145 (block 810). For example, service provider A may collect performance data while a subscriber is on the "home" network (i.e., network 110) and service provider B collects performance data while the subscriber is on the roaming network (i.e., network 120). Service providers A and B may also send call session event information to block chain nodes 135 and 145 when the subscriber is within the respective cellular geographic service areas (CGSAs) associated with networks 110 and 120 (block 820).

Block chain nodes 135 and 145 store the performance data and session event information in BL 136/146. Block chain nodes 135 and 145 may also compare collected performance data to predefined slice SLA performance data/targets store in BLs 136 and 146 (block 830). Block chain nodes 135 and 145 may also analyze roaming events and other messages. Block chain nodes 135 and 145 may then determine if an SLA violation or other problem has occurred (block 840). If an SLA violation has occurred (block 840—yes), block nodes 135 and 145 may store the SLA violation in BLs 136 and 146, along with a flag and/or timestamp (block 850).

For example, if an end-to-end delay SLA for a communication session is set at 20 milliseconds (ms) and the actual delay is 35 ms, block chain nodes 135 and 145 may determine that an SLA violation occurred. Block chain nodes 135 and 145 may forward/push the SLA violation information to OSS 130 and OSS 140. If no SLA violation or other problem has occurred (block 840—no), processing may continue.

In addition, block chain nodes 135 and 145 may interface with a graphical user interface (GUI) that allows service providers (and in some implementations, users) to log into block chain nodes 135 and 145 and view portions of BLs 136 and 146. As discussed above, in some implementations, block chain nodes 135 and 145 may abstract or generalize the performance data and/or event/message information based on mutually agreed upon parameters. Service providers A and B may each access/log into block chain nodes 135 and 145 and view the abstracted records stored in BLs 136 and 146 (block 860). In some implementations, a user at user device 160 may also log into block chain nodes 135 and/or 145 and view abstracted records associated with his/her account. However, the user may be provided with different records or information than the service providers. That is, the user may be provided with information that is only relevant to his/her account and not to network data associated with the service providers.

As described above, block chain ledgers 136 and 146 may contain information regarding slice types implemented in networks 110 and 120, such as slice types defined in accordance with a GSMA GST format. Block ledgers 136 and 146 may also store information regarding service types which may be defined using a service template, such as a generic service template. In such implementations, a service provider, such as service provider A or B, may determine how to support such service type(s), such as with a single slice, or multiple slices. In this case, block chain nodes 135 and 145 may determine if SLA violations occur with the service(s) by checking the information stored in BLs 136 and 146 in a manner similar to that described above.

As described above, block chain node 135 and BL 136 may be co-located and be implemented by a service provider, such as service provider A. In other implementations, block chain node 135 and BL 136 may be implemented as two or more physically separate systems/containers. In addition, block chain node 135 and BL 136 may be implemented by a third party that is external to both service providers A and B, based on a mutual agreement between the service providers. In each case, block chain node 135/145 and BL 136/146 are secure and provide privacy and transparency with respect to data stored in BL 136. That is, BL 136/146 provides both service providers A and B with shared, verifiable capacity, event messaging, and performance records that cannot be inadvertently or intentionally modified by any unauthorized party.

As described above, slice parameter specifications (e.g., based on a GST format), may be used to implement an agreement between communication service providers A and B, and may be stored in block chain ledger 136/146. In some implementations, a "smart" contract may also be implemented in the block chain ledger 136/146 to reduce and/or eliminate issues associated with billing for roaming services.

For example, a smart contract may include computer code stored within BL 136 and 146 that implements a set of rules. In this implementation, the smart contract may determine whether a particular service provider, such as service provider B is performing in accordance with the rules associated with the network slice parameters agreed to for network 120. For example, the smart contract may include code/instructions for automatically adjudicating or resolving claims using performance data 340 stored in BL 136/146. In this manner, the smart contracts stored in BL 136/146 may significantly reduce or eliminate contention between service providers A and B associated with reconciling SLA issues or other problems associated with communication sessions that may be handed off between services providers A and B. Likewise, usage data stored on BL 136/146 more be used to generate billing information.

Implementations described herein use block chain technology to assist in managing and monitoring inter-service provider roaming service agreements. A network slice parameter specification according to a GSMA GST may be used to form the basis for an agreement between communication service providers and simplify the formation of the agreement. The agreement and parameters associated with the agreement may be stored in a block chain ledger to ensure data security and privacy. A block chain node may also automatically push state changes, SLA violations and other information to the service providers, which saves time for each service provider attempting to identify violations or other information of interest associated with inter-service provider communication sessions.

The foregoing description of exemplary implementations provides illustration and description, but is not intended to be exhaustive or to limit the embodiments to the precise form disclosed. Modifications and variations are possible in light of the above teachings or may be acquired from practice of the embodiments.

For example, while features have been mainly described with respect to two service providers associated with networks 110 and 120, respectively, environment 100 may include additional service providers that each implement block chain nodes and distributed block chain ledgers.

Further, while features have been above with respect to using block chain nodes implementing a block chain ledger, in other implementations, a trusted entity may be used to store GST information and other information described above. For example, a trusted entity that is agreed upon by service providers A and B may include a memory to store a ledger associated with inter-service provider communications, such as GST information, handoffs. In this case, the trusted entity may ensure that the GST information, performance data and call session event information data are reliable and highly secure.

Still further, while series of acts have been described with respect to FIGS. 4, 5, 7 and 8 and signal flows with respect to FIG. 6, the order of the acts and/or signal flows may be different in other implementations. Moreover, non-dependent acts may be implemented in parallel.

To the extent the aforementioned embodiments collect, store or employ personal information of individuals, it should be understood that such information shall be collected, stored and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that various features described above may be implemented in many different forms of software, firmware, and hardware in the implementations illustrated in the figures. The actual software code or specialized control hardware used to implement the various features is not limiting. Thus, the operation and behavior of the features were described without reference to the specific software code—it being understood that one of ordinary skill in the art would be able to design software and control hardware to implement the various features based on the description herein.

Further, certain portions of the invention may be implemented as "logic" that performs one or more functions. This logic may include hardware, such as one or more processors, microprocessor, application specific integrated circuits, field programmable gate arrays or other processing logic, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method, comprising:
storing, in a block chain ledger, information associated with an agreement between a first service provider associated with a first network and a second service provider associated with a second network;
receiving, by a device, first capacity information associated with slices in the first network;
storing the first capacity information in the block chain ledger;
receiving, by the device, a message associated with a roaming handoff for an existing communication session in the first network;
querying, by the device, the block chain ledger to determine whether adequate resources are available in the second network to support the existing communication session;
determining, by the device and based on results of the querying, whether adequate resources are available in the second network to support the existing communication session; and
sending, to the first service provider, a second message indicating that adequate resources are available in the second network to support the existing communication session, wherein the first service provider initiates the roaming handoff to the second service provider in response to receiving the second message.

2. The method of claim 1, wherein the device comprises a block chain node, the method further comprising:
receiving, by the block chain node, performance data associated with the existing communication session from the first service provider; and
storing the performance data in the block chain ledger.

3. The method of claim 2, further comprising:
determining whether a service level agreement (SLA) violation has occurred based on information associated with the agreement between the first service provider and the second service provider stored in the block chain ledger and performance data associated with the second service provider stored in the block chain ledger; and
storing an SLA violation indication in the block chain ledger, in response to determining that the SLA violation has occurred.

4. The method of claim 3, further comprising:
sending, by the device, information indicating the occurrence of the SLA violation to at least one of the first service provider or second service provider.

5. The method of claim 2, further comprising:
modifying the performance data in accordance with the agreement between the first service provider and the second service provider prior to storing the performance data in the block chain ledger.

6. The method of claim 1, further comprising:
identifying, via the block chain ledger, alternate resources in the second network to support the existing communication session, in response to determining that adequate resources are not available in the second network.

7. The method of claim 1, further comprising:
automatically identifying, via the block chain ledger, a best match service that is available from the second service provider corresponding to a service provided by the first service provider.

8. The method of claim 1, further comprising:
receiving, from a subscriber associated with the existing communication session, at least one of a quality of experience (QoE) or quality of service (QoS) information associated with a quality of the existing communication session; and storing the at least one of QoE or QoS information in the block chain ledger.

9. The method of claim 1, further comprising:
receiving, by the device, a request for information from the first service provider; and
providing, by the device, information associated with the request.

10. The method of claim 9, wherein the request for information comprises a request for service level agreement (SLA) violations associated with the second service provider; and wherein the providing comprises:
providing information identifying SLA violations associated with the second service provider.

11. The method of claim 1, further comprising:
storing, in the block chain ledger, first network slice definitions implemented in the first network; and
storing, in the block chain ledger, second network slice definitions implemented in the second network.

12. A system, comprising:
a memory; and
a device configured to:
store, in the memory, information associated with an agreement between a first service provider associated with a first network and a second service provider associated with a second network,
receive first capacity information associated with slices in the first network,
store the first capacity information in the memory,
receive a message associated with a roaming handoff for an existing communication session in the first network,
determine, by querying the memory, whether adequate resources are available in the second network to support the existing communication session, and
send, to the first service provider, a second message indicating that adequate resources are available in the second network to support the existing communication session, wherein the first service provider initiates the roaming handoff to the second service provider in response to receiving the second message.

13. The system of claim 12, wherein the memory comprises a block chain ledger and wherein the device is further configured to:
receive performance data associated with the existing communication session; and
store the performance data in the block chain ledger.

14. The system of claim 13, wherein the device is further configured to:
determine whether a service level agreement (SLA) violation has occurred based on information associated with the agreement between the first service provider and the second service provider stored in the block chain ledger and performance data associated with the second service provider stored in the block chain ledger; and
store an SLA violation indication in the block chain ledger, in response to determining that the SLA violation has occurred.

15. The system of claim 14, wherein the device is further configured to:
send a third message indicating the occurrence of the SLA violation to at least one of the first service provider or second service provider.

16. The system of claim 12, wherein the device comprises a block chain node.

17. The system of claim 12, wherein the device is further configured to:
identify, via the memory, alternate resources in the second network to support the existing communication session, in response to determining that adequate resources are not available in the second network.

18. The system of claim 12, wherein the device is further configured to:
store, in the memory, first network slice definitions associated with network slices implemented in the first network; and
store, in the memory, second network slice definitions associated with network slices implemented in the second network.

19. A non-transitory computer-readable medium having stored thereon sequences of instructions which, when executed by at least one processor, cause the at least one processor to:
store, in a block chain ledger, information associated with an agreement between a first service provider associated with a first network and a second service provider associated with a second network;
receive capacity information associated with slices in the second network;
store the capacity information in the block chain ledger;
receive, from a first user device, a message associated with the first user device roaming onto the second network for an existing communication session;
determine, by querying the block chain ledger, whether adequate resources are available in the second network to support the existing communication session for the first user device roaming onto the second network; and
establish, by the second network, a roaming communication session with the first user device, in response to determining that adequate resources are available in the second network to support the existing communication session.

20. The non-transitory computer-readable medium of claim 19, wherein the instructions further cause the at least one processor to:
receive performance data associated with the existing communication session;
store the performance data in the block chain ledger;
determine whether a service level agreement (SLA) violation has occurred based on the performance data and the information associated with the agreement between the first service provider and the second service provider; and
store an SLA violation indication in the block chain ledger in response to determining that the SLA violation has occurred.

* * * * *